(12) United States Patent
Sun

(10) Patent No.: US 11,917,577 B2
(45) Date of Patent: Feb. 27, 2024

(54) PAGING METHOD, POSITIONING INFORMATION SENDING METHOD, CORE NETWORK NODE AND BASE STATION

(71) Applicant: DATANG MOBILE COMMUNICATIONS EQUIPMENT CO., LTD., Beijing (CN)

(72) Inventor: Jiancheng Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 330 days.

(21) Appl. No.: 17/294,369

(22) PCT Filed: Nov. 12, 2019

(86) PCT No.: PCT/CN2019/117462
§ 371 (c)(1),
(2) Date: May 14, 2021

(87) PCT Pub. No.: WO2020/098632
PCT Pub. Date: May 22, 2020

(65) Prior Publication Data
US 2022/0007328 A1    Jan. 6, 2022

(30) Foreign Application Priority Data
Nov. 14, 2018 (CN) .......................... 201811352020.X

(51) Int. Cl.
*H04W 68/00* (2009.01)
*H04B 7/185* (2006.01)

(52) U.S. Cl.
CPC ...... *H04W 68/005* (2013.01); *H04B 7/18547* (2013.01); *H04B 7/18558* (2013.01)

(58) Field of Classification Search
CPC ... H04W 68/005; H04W 84/005; H04W 8/02; H04W 60/04; H04W 76/34; H04W 84/06;
(Continued)

(56) References Cited

U.S. PATENT DOCUMENTS

| 2002/0052180 | A1 | 5/2002 | Ravishankar et al. |
| 2008/0102826 | A1* | 5/2008 | Voyer ............... H04W 68/02 455/432.1 |

(Continued)

FOREIGN PATENT DOCUMENTS

| CN | 101198103 A | 6/2008 |
| CN | 104540116 A | 4/2015 |

(Continued)

OTHER PUBLICATIONS

Supplementary European Search Report for EPO Application No. 19885770.8, dated Jan. 27, 2022.
(Continued)

*Primary Examiner* — Ayaz R Sheikh
*Assistant Examiner* — Tarell A Hampton
(74) *Attorney, Agent, or Firm* — Ladas & Parry, LLP

(57) ABSTRACT

The present disclosure provides a paging method, a positioning information sending method, a core network node and a base station, and relates to the technical field of communication. The paging method is applied to the core network node in a satellite Internet communication system and comprises the following steps: acquiring the setting mode of the tracking area TA in the satellite Internet communication system; determining the base station for paging the terminal according to the setting mode; and sending a paging message to the base station; wherein the setting mode comprises one of the following setting mode:

(Continued)

dividing the satellite Internet communication system one TA; setting at least two fixed TAs; and setting at least two non-fixed TAs.

14 Claims, 3 Drawing Sheets

(58) Field of Classification Search
CPC .. H04W 68/04; H04W 64/00; H04B 7/18547; H04B 7/18558; H04B 7/18563; H04B 7/18578
See application file for complete search history.

(56) References Cited

U.S. PATENT DOCUMENTS

| | | | |
|---|---|---|---|
| 2010/0220680 A1* | 9/2010 | Ramankutty | H04W 68/08 370/329 |
| 2018/0098360 A1 | 4/2018 | Vos et al. | |
| 2018/0270699 A1 | 9/2018 | Babei et al. | |
| 2019/0082481 A1* | 3/2019 | Ravishankar | H04W 76/10 |
| 2020/0077358 A1* | 3/2020 | Kovacs | H04W 64/006 |
| 2021/0112523 A1* | 4/2021 | Liubinskas | H04W 76/11 |
| 2021/0212014 A1* | 7/2021 | Gao | H04W 64/00 |
| 2021/0235416 A1* | 7/2021 | Dou | H04W 48/16 |
| 2021/0376915 A1* | 12/2021 | Mahalingam | H04W 72/542 |
| 2022/0007267 A1* | 1/2022 | Maattanen | H04W 16/12 |
| 2022/0052756 A1* | 2/2022 | Choinière | H04B 7/18539 |
| 2022/0060959 A1* | 2/2022 | Atungsiri | H04W 36/32 |

FOREIGN PATENT DOCUMENTS

| | | |
|---|---|---|
| CN | 106506061 A | 3/2017 |
| EP | 1163742 A1 | 12/2001 |
| WO | 2000/059136 A1 | 10/2000 |
| WO | 2015128020 A1 | 9/2015 |

OTHER PUBLICATIONS

"Tracking Area and UE position in NTN" 3GPP TSG-RAN WG3 #102; R3-186661, Agenda Item: 20.2.3 Source: Nokia, Nokia Shanghai Bell.
"Are Tracking Area Stationary or Not?" GPP TSG-RAN WG3 #102, R3-186828, Nov. 11, 2018; Agenda Item: 20.2.1, Source: Ericsson.
International Search Report from PCT/CN2019/117462, dated Jan. 21, 2020, with English translation provided by WIPO, all pages.
Written Opinion of the International Searching Authority from PCT/CN2019/117462, dated Jan. 21, 2020, with English translation provided by WIPO, all pages.
International Preliminary Report on Patentability from PCT/CN2019/117462, dated May 18, 2021, with English translation provided by WIPO, all pages.
First Office Action and search report from CN app. No. 201811352020.X, dated Nov. 4, 2020, with English translation from Global Dossier, all pages.
ZTE, Sanechips, "Discussion on Tracking Area Management in NTN", R2-1814243, 3GPP TSG-RAN WG2 #103bis, Chengdu, China, Oct. 8-12, 2018, all pages.
ZTE, Sanechips, "Tracking Area Management and Paging Handling in NTN", R3-186328, 3GPP TSG-RAN WG3 #102, Spokane, WA, USA, Nov. 12-16, 2018, all pages.

* cited by examiner

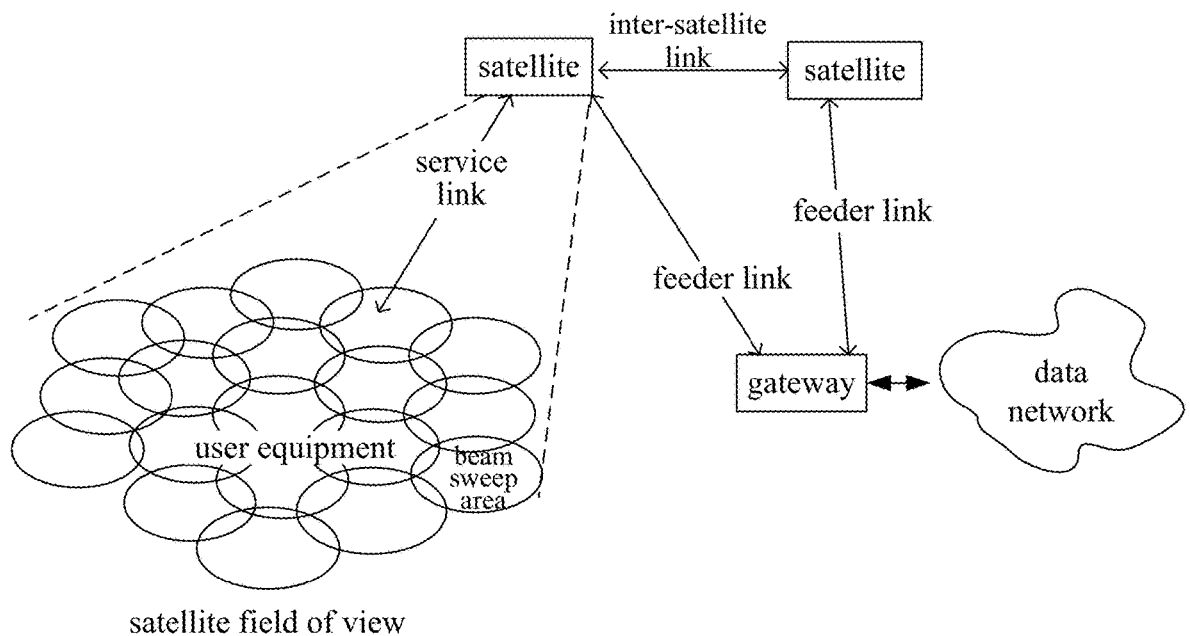
Fig. 1
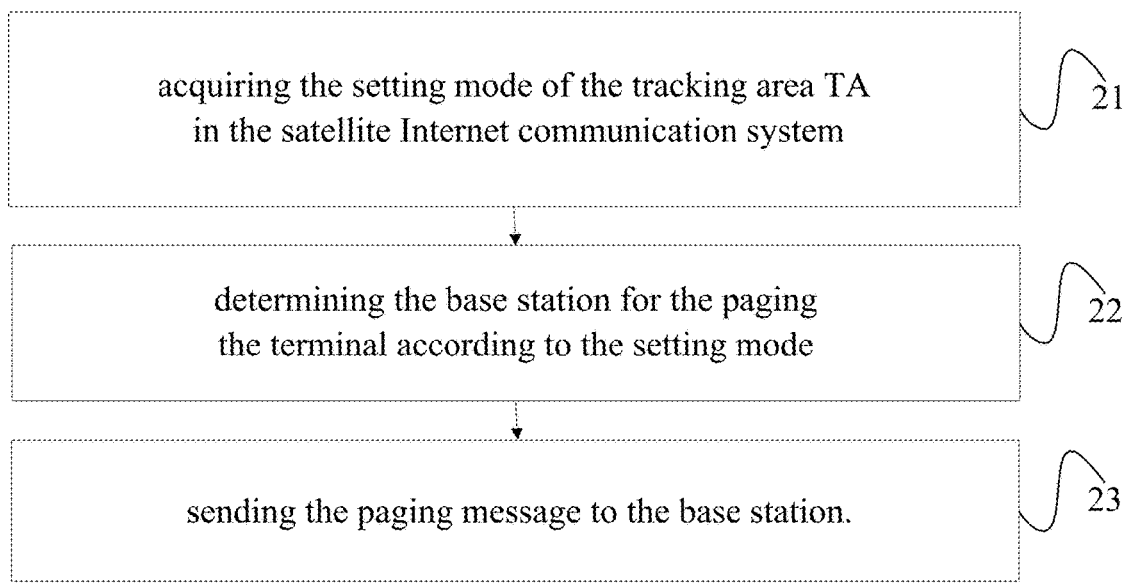
Fig. 2
Fig. 3 when the setting mode of the tracking area TA in the satellite Internet communication system is dividing the satellite Internet communication system into one TA and the terminal has positioning capability, when the terminal releases the connection, the positioning information of the terminal is sent to the core network node. ~ 41
Fig. 4
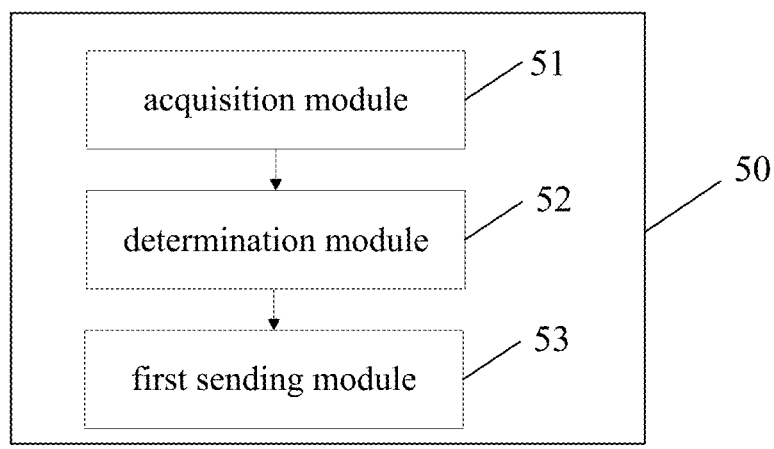
Fig. 5
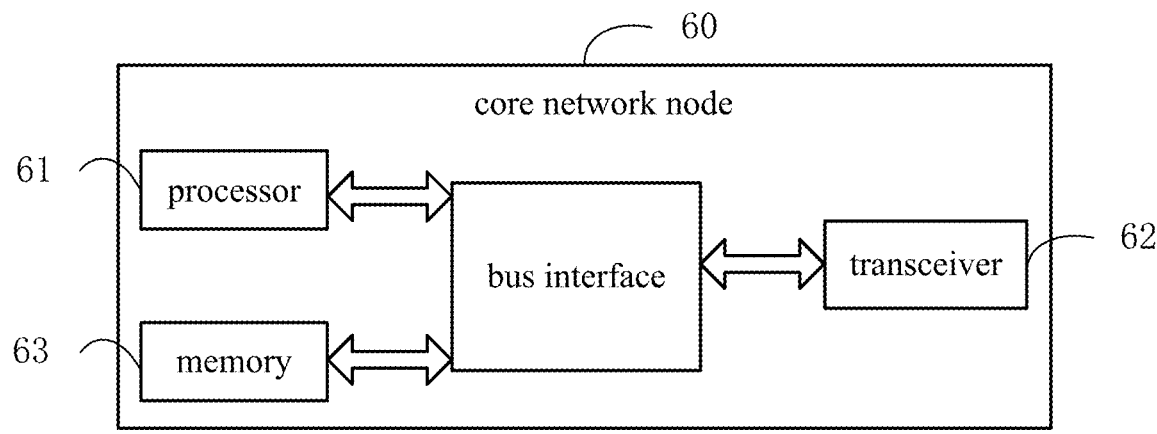
Fig. 6

PAGING METHOD, POSITIONING INFORMATION SENDING METHOD, CORE NETWORK NODE AND BASE STATION

CROSS-REFERENCE TO RELATED APPLICATIONS

This application is the U.S. national phase of PCT Application No. PCT/CN2019/117462 filed on Nov. 12, 2019, which claims priority to Chinese Patent Application No. 201811352020. X, filed on Nov. 14, 2018 in China, the disclosures of which are incorporated in their entireties by reference herein.

TECHNICAL FIELD

The disclosure relates to the technical field of communication, in particular to a paging method, a positioning information sending method, a core network node and a base station.

BACKGROUND OF THE INVENTION

The satellite Internet has the advantages of wide coverage, small influence caused by natural disasters and physical attacks and the like. The satellite Internet can be deeply integrated with a ground mobile communication network (5G) to make up deficiency of the ground mobile network, and an integrated network system with complementary advantages, close integration and three-dimensional layering is formed by the ground network and the satellite Internet, and information transmission and interaction in the global range are realized.

The satellites in the satellite Internet are classified into geosynchronous satellites, medium-earth-orbit satellites and low-earth-orbit satellites; the low-earth-orbit satellites have characteristic of the short distance between the satellites and the ground, and the communication delay between the satellites and ground terminals is moderate, at the same time, the low-earth-orbit satellites have the characteristics of fast moving speed, large path loss, limited power on satellite and the like.

A basic assumption of the conventional mobile communication access network is that a base station in a RAN (radio access network)( ) is fixed and a UE (user equipment) is mobile. All network designs, from physical layer parameters to network identification, are based on the above assumption.

A very important difference between satellite Internet access networks and conventional mobile access networks is that the base stations in the RAN are not necessarily stationary, e.g. for the low-earth-orbit satellites, when the satellites carry the base stations, the base stations may be moving at high speeds. In addition to considering the mobility of the user equipment (UE) itself, the coverage of the base stations in the RAN changes rapidly with the rapid movement of the low-earth-orbit satellites, which presents new challenges to mobility management.

In a conventional mobile communication system, the coverage of a cell is fixed, the area of a tracking area (TA) is fixed, and the network performs paging management for the UE based on a registration area (TA list) of the UE. However, in a satellite Internet communication system, the satellite may be mobile, in this case there is no solutions how to allocate TAs and how to page the UE.

SUMMARY OF THE INVENTION

The embodiment of the disclosure provides a paging method, a positioning information sending method, a core network node and a base station, and aims to solve the problems that terminal paging cannot be realized and communication reliability of a satellite Internet communication system cannot be guaranteed because an allocation manner of tracking area is not specified in the satellite Internet communication system.

In order to solve the above technical problems, the embodiment of the present disclosure provides a paging method, which is applied to the core network node in the satellite Internet communication system, and includes:

acquiring the setting mode of the tracking area (TA) in the satellite Internet communication system;

determining the base station for the paging the terminal according to the setting mode; and sending a paging message to the base station;

wherein the setting mode includes one of the following modes:

dividing the satellite Internet communication system into one TA;

setting at least two fixed TAs; and setting at least two non-fixed TAs.

Optionally, when the setting mode is dividing the satellite Internet communication system into one TA, the determining the base station for paging the terminal includes:

determining all base stations in the satellite Internet communication system as the base stations for currently paging the terminal.

Optionally, when the setting mode is dividing the satellite Internet communication system into one TA, and the terminal has positioning capability, the determining the base station for paging the terminal, includes:

acquiring positioning information of the terminal when the terminal releases the connection and moving track of the satellite; and determining the base station for currently paging the terminal according to the positioning information and the moving track of the satellite.

Optionally, when the setting mode is dividing the satellite Internet communication system into one TA and the terminal does not have positioning capability, the determining the base station for paging the terminal includes:

acquiring the information of a serving base station, a serving cell and a time stamp when the terminal releases the connection;

determining the position of the terminal according to the information of the serving base station, the serving cell and the time stamp; and determining the base station for currently paging the terminal according to the position of the terminal.

Optionally, when the setting mode is setting at least two fixed TAs, one of the fixed TAs includes at least one ground cell when the ground cell corresponding to the beam of the base station belonging to the fast-moving medium or low orbit satellites is the fixed cell.

Optionally, when the setting mode is setting at least two fixed TAs and when the ground cell corresponding to the beam of the base station belonging to the fast-moving medium or low orbit satellites is the mobile cell, an updating manner of the fixed TAs is: according to the position of the statically allocated fixed TA, the position and the beam coverage condition of the base station, when it is determined that the cell managed by the base station moves to the area of the next fixed TA, the base station reconfigures the fixed TA, and the reconfigured TA information is broadcasted in a broadcast through system information updating.

Furthermore, the determining the base station for paging the terminal includes:

acquiring first TA update information sent by a first base station where the TA update occurs;

determining the latest TA information of the current satellite Internet communication system according to the first TA update information; and determining the base station for currently paging the terminal according to the latest TA information and the TA registered by the terminal when the terminal needs to be paged.

Furthermore, the determining the base station for paging the terminal includes:

acquiring second TA update information sent by a second base station, where TA update occurs within a preset time;

determining a TA updating rule of the base station according to the second TA update information; and when the terminal needs to be paged, determining the base station for currently paging the terminal according to the TA updating rule and the TA registered by the terminal.

Furthermore, the determining the base station for paging the terminal includes:

acquiring TA information supported on a whole satellite orbit; and determining the base station for currently paging the terminal according to the TA information and a pre-configured ephemeris when the terminal needs to be paged.

Optionally, when the setting mode is that at least two non-fixed TAs are set, the determining the base station for paging the terminal includes:

determining the base station corresponding to the TA to which the terminal belongs as the base station for currently paging the terminal.

The embodiment of the present disclosure also provides a paging method applied to a base station in the satellite Internet communication system, including:

receiving a paging message sent by the core network node according to the setting mode of the tracking area TA;

wherein the setting mode includes one of the following modes:

dividing the satellite Internet communication system into one TA;

setting at least two fixed TAs; and setting at least two non-fixed TAs.

Optionally, the setting mode includes: when at least two fixed TAs are set, the paging method further includes the steps:

if the TA information is updated, sending first TA update information to the core network node.

Optionally, the setting mode includes: when at least two fixed TAs are set, the paging method further includes the steps:

in the preset time, if the TA information is updated, sending the second TA update information to the core network node.

Optionally, the setting mode includes: when at least two fixed TAs are set, the paging method further includes the steps:

according to the position of the statically allocated fixed TA, the position and the beam coverage condition of the base station, when it is determined that the cell managed by the base station moves to the area of the next fixed TA, the base station reconfigures the fixed TA, and the reconfigured TA information is broadcasted in a broadcast through system information updating;

wherein, the base station is a base station belonging to a fast-moving medium or low orbit satellite.

The embodiment of the present disclosure also provides a positioning information sending method which is applied to the base station in the satellite Internet communication system and includes the following steps that:

when the setting mode of the tracking area TA in the satellite Internet communication system is dividing the satellite Internet communication system into one TA and the terminal has positioning capability, when the terminal releases the connection, the positioning information of the terminal is sent to the core network node; or when the setting mode of the TA in the satellite Internet communication system is dividing the satellite Internet communication system into one TA and the terminal does not have positioning capability, when the terminal releases the connection, the serving base station, the serving cell and the time stamp information of the terminal are sent to the core network node.

The embodiment of the present disclosure also provides the core network node in the satellite Internet communication system, including a memory, a processor, and a computer program stored on the memory and executable by the processor; when executing the computer program, the processor performs the following steps:

acquiring the setting mode of the tracking area (TA) in the satellite Internet communication system;

determining the base station for the paging the terminal according to the setting mode; and sending the paging message to the base station;

wherein the setting mode includes one of the following modes:

dividing the satellite Internet communication system into one TA;

setting at least two fixed TAs; and setting at least two non-fixed TAs.

Optionally, when the setting mode is dividing the satellite Internet communication system into one TA, the processor, when executing the computer program, performs the following step:

determining all base stations in the satellite Internet communication system as the base stations for currently paging the terminal.

Optionally, when the setting mode is dividing the satellite Internet communication system into one TA, and the terminal has positioning capability, the processor, when executing the computer program, performs the following steps:

acquiring positioning information of the terminal when the terminal releases the connection and moving track of the satellite; and determining the base station for currently paging the terminal according to the positioning information and the moving track of the satellite.

Optionally, when the setting mode is dividing the satellite Internet communication system into one TA and the terminal does not have positioning capability, the processor, when executing the computer program, performs the following steps:

acquiring the of a serving base station, a serving cell and time stamp information when the terminal releases the connection;

determining the position of the terminal according to the serving base station, the serving cell and the time stamp information; and determining the base station for currently paging the terminal according to the position of the terminal.

Optionally, when the setting mode is setting at least two fixed TAs, one of the fixed TAs includes at least one ground cell when the ground cell corresponding to the beam of the base station belonging to the fast-moving medium or low orbit satellite is the fixed cell.

Optionally, when the setting mode is setting at least two fixed TAs and when the ground cell corresponding to the beam of the base station belonging to the fast-moving medium or low orbit satellites is the mobile cell, an updating manner of the fixed TAs is: according to the position of the statically allocated fixed TA, the position and the beam coverage condition of the base station, when it is determined that the cell managed by the base station moves to the area of the next fixed TA, the base station reconfigures the fixed TA, and the reconfigured TA information is broadcasted through the system information updating.

Furthermore, when executing the computer program, the processor performs the following steps:

acquiring the first TA update information sent by the first base station where the TA update occurs;

determining the latest TA information of the current satellite Internet communication system according to the first TA update information; and determining the base station for currently paging the terminal according to the latest TA information and the TA registered by the terminal when the terminal needs to be paged.

Furthermore, when executing the computer program, the processor performs the following steps:

acquiring the second TA update information sent by the second base station, wherein TA update occurs in the second base station within the preset time;

determining the TA updating rule of the base station according to the second TA update information; and determining the base station for currently paging the terminal according to the TA updating rule and the TA registered by the terminal when the terminal needs to be paged.

Furthermore, when executing the computer program, the processor performs the following steps:

acquiring the TA information supported on the whole satellite orbit; and determining the base station for currently paging the terminal according to the TA information and the pre-configured ephemeris when the terminal needs to be paged.

Optionally, when the setting mode is that at least two non-fixed TAs are set, the processor, when executing the computer program, performs the following step:

determining the base station corresponding to the TA to which the terminal belongs as the base station for currently paging the terminal.

The embodiment of the present disclosure also provides the base station in the satellite Internet communication system including a memory, a processor, and a computer program stored on the memory and executable by the processor; the processor, when executing the computer program, performs the following steps:

receiving the paging message sent by the core network node according to the setting mode of the tracking area TA;

wherein the setting mode includes one of the following modes:

dividing the satellite Internet communication system into one TA;

setting at least two fixed TAs; and setting at least two non-fixed TAs.

Optionally, the setting mode includes: when at least two fixed TAs are set, the processor, when executing the computer program, implements the following step:

if the TA information is updated, sending the first TA update information to the core network node.

Optionally, the setting mode includes: when at least two fixed TAs are set, the processor, when executing the computer program, implements the following step:

in the preset time, if the TA information is updated, sending the second TA update information to the core network node.

Optionally, the setting mode includes: when at least two fixed TAs are set, the processor, when executing the computer program, implements the following step:

according to the position of the statically allocated fixed TA, the position and the beam coverage condition of the base station, when it is determined that the cell managed by the base station moves to the area of the next fixed TA, the base station reconfigures the fixed TA, and the reconfigured TA information is broadcasted in a broadcast through system information updating;

wherein, the base station is the base station belonging to the fast-moving medium or low orbit satellite.

The embodiment of the present disclosure also provides the base station in the satellite Internet communication system including the memory, the processor, and the computer program stored on the memory and executable by the processor; the processor, when executing the computer program, performs the following steps:

when the setting mode of the tracking area TA in the satellite Internet communication system is dividing the satellite Internet communication system into one TA and the terminal has positioning capability, when the terminal releases the connection, the positioning information of the terminal is sent to the core network node; or when the setting mode of the TA in the satellite Internet communication system is dividing the satellite Internet communication system into one TA and the terminal does not have positioning capability, when the terminal releases the connection, the serving base station, the serving cell and the time stamp information of the terminal are sent to the core network node.

The embodiment of the present disclosure also provides a computer-readable storage medium having a computer program stored thereon, characterized in that the above-described paging method or the above-described positioning information sending method are implemented when the computer program are executed by a processor.

The embodiment of the present disclosure also provides a core network node in the satellite Internet communication system, including:

an acquisition module, which is used for acquiring the setting mode of the tracking area TA in the satellite Internet communication system;

a determining module, which is configured for determining the base station for paging the terminal according to the setting mode; and a first sending module, which is configured for sending the paging message to the base station;

wherein the setting mode includes one of the following modes:

dividing the satellite Internet communication system into one TA;

setting at least two fixed TAs; and setting at least two non-fixed TAs.

The embodiment of the present disclosure also provide a base station in the satellite Internet communication system, including:

a receiving module, which is configured for receiving the paging message sent by the core network node according to the setting mode of the tracking area TA;

wherein the setting mode includes one of the following modes:

dividing the satellite Internet communication system into one TA;

setting at least two fixed TAs; and setting at least two non-fixed TAs.

The embodiment of the present disclosure also provide a base station in the satellite Internet communication system, including:

a second sending module, which is configured for sending the positioning information of the terminal to the core network node when the terminal releases the connection when the setting mode of the tracking area TA in the satellite Internet communication system is dividing the satellite Internet communication system into one TA and the terminal has positioning capability; or when the TA in the satellite Internet communication system is set in such a way dividing the satellite Internet communication system into one TA and the terminal does not have positioning capability, the information of the serving base station, the serving cell and the time stamp of the terminal are sent to the core network node when the terminal releases the connection.

Beneficial effects of the present disclosure are:

according to the scheme, the base station for paging the terminal when the terminal needs to be paged is determined according to the setting mode of the TA in the satellite Internet communication system, so that the paging process in the satellite Internet communication system is improved, and the communication reliability of the satellite Internet communication system can be ensured.

BRIEF DESCRIPTION OF THE DRAWINGS

FIG. 1 is an architecture diagram of a satellite Internet communication system;

FIG. 2 is a schematic flow diagram of a paging method applied to a core network node according to an embodiment of the present disclosure;

FIG. 3 is a schematic flow diagram of a paging method applied to a base station according to an embodiment of the present disclosure;

FIG. 4 is a schematic flow diagram of a positioning information sending method applied to a base station according to an embodiment of the present disclosure;

FIG. 5 is a module schematic diagram of a core network node according to an embodiment of the present disclosure;

FIG. 6 is a structure diagram of a core network node according to an embodiment of the present disclosure;

DETAILED DESCRIPTION OF THE INVENTION

Figure 7:
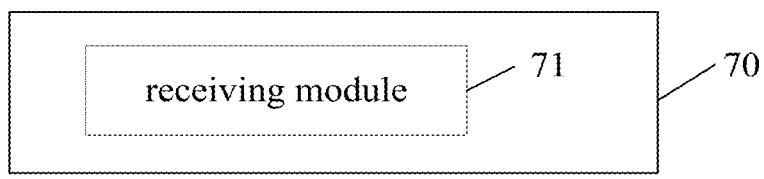
FIG. 7 is a first module schematic diagram of a base station according to an embodiment of the present disclosure.

To further clarify the objects, features and advantages of the present disclosure, a more particular description of the disclosure will be rendered by reference to specific embodiments thereof which are illustrated in the appended drawings.

Some of the concepts mentioned in this disclosure are described in detail below.

Satellite Internet is a new communication network that combines satellite communication with Internet and other information networks. It is an information network infrastructure that provides global real-time and seamless broadband Internet services for various users such as land, ocean and sky by using high, medium and low orbit broadband satellites. The satellite Internet, the ground 5G network and the ground Internet are complemented with each other, so that information can be achieved freely and all things can be accessed. As shown in FIG. 1, an architecture diagram of a satellite Internet communication system is shown.

On the basis of 5G and ground Internet, the satellite Internet satellite takes advantage of a satellite access technology which has the characteristics of global coverage, low-cost access, less influence by physical attack and natural disaster, provides services such as aviation communication, ocean communication and universal service, forms a fusion network system with complementary advantages, close fusion and three-dimensional layering with the terrestrial network, and realizes the transmission and interaction of information in the global range.

A standard system with independent intellectual property rights is established by taking a new satellite Internet technology as a traction, which is autonomous and controllable in China, so that the work of system development, interface design, terminal development, information security and the like of the Internet space section, the ground section and the application section of the satellite Internet can be guided, strong advancement, internationalization and universality are achieved on the basis of meeting business requirements, new technology products are promoted, innovation of new application scenarios and industrialization of product research and development is developed.

In the process of Satellite Internet construction in China, the deep integration of the sky and the ground is the core goal of the system, the role of the integration of the sky and the ground will be reflected in the five aspects of "complementary advantages, business transparent, network universal, technical reference, industry collaboration".

In the case of high-speed movement of the satellite, the beams of the satellite sweep across the ground rapidly, so if the satellite carries a base station, these swept beams correspond to an actual physical cell (one or more beams are mapped to a cell), which means that the physical cell is rapidly changing at the surface of the earth.

If the TA is bound to the base station on the satellite, or if the TA is bound to the cell under the base station on the satellite, then the TA also changes continuously from the ground.

Paging of UEs in the mobile communication is currently based on the registration area (TA list) of the UEs. There is no clear solution to solve the problems about how to allocate TA and how to support the paging for the UE efficiently in the satellite Internet communication system.

Aiming at the problems, the embodiments of the present disclosure provide a paging method, a positioning information sending method, a core network node and a base station.

Specifically, as shown in FIG. 2, the paging method according to the embodiment of the present disclosure is applied to the core network node in the satellite Internet communication system, including:

step 21, acquiring the setting mode of the tracking area TA in the satellite Internet communication system; and it should be noted that the setting mode include at least one of the following modes:

A1, dividing the satellite Internet communication system into one TA;

It should be noted that the entire satellite Internet communication system has only one TA, which actually weakens the TA concept. The TA-based paging means that the terminal may need to be paged throughout the TA, that is to say, when the terminal is paged under all base stations in the entire satellite Internet, this setting mode of paging is relatively simple to be implemented under all base stations of the entire satellite network.

A2, setting at least two fixed TAs;

It should be noted that a fixed TA means that the division of the TA is fixed with respect to the ground, that is to say, the TA at a particular position on the ground is fixed.

For the TA in this way, the paging of the terminal is performed in the registration area of the terminal, and the TA updating process is performed when the terminal moves out of the registration area.

and A3, setting at least two non-fixed TAs;

It should be noted that the non-fixed TA refers to that the division of the TA is non-fixed with respect to the ground, that is to say, the TA is bound to the base station on the satellite, or the TA is bound to the cell under the base station on the satellite, and the TA moves with the movement of the base station on the satellite.

In this setting mode, the paging of the terminal is based on the TA where the terminal are located, but the terminal needs to constantly update the TA.

Step 22, determining the base station for the paging the terminal according to the setting mode; and step 23, sending the paging message to the base station.

A detailed description to determination of the base station for paging the terminal under different setting mode will be described below, respectively.

Firstly, the setting mode is dividing the satellite Internet communication system into one TA.

Optionally, in this way, the first implementation means of the step 22 is:

determining all base stations in the satellite Internet communication system as the base stations for currently paging the terminal.

It should be noted that in this way, each time the terminal is needed to be paged, paging is required to be performed under all base stations in the satellite Internet communication system.

It should be noted that in the first implementation means described above, a large amount of signaling is transmitted in the satellite Internet communication system, resulting in a large resource overhead for paging. To avoid this, in the embodiments of the present disclosure, Optionally, the base station for currently paging the terminal is determined using the location information of the terminal (including historical location information of the terminal and the possible location information of the terminal).

Optionally, when the terminal needed to be paged has positioning capability, the second implementation means of the step 22 is:

acquiring positioning information of the terminal when the terminal releases the connection and moving track of the satellite; and determining the base station for currently paging the terminal according to the positioning information and the moving track of the satellite.

It should be noted that in this implementation, when the terminal releases the connection, the base station connected before the terminal releases the connection will send the positioning information of the terminal to the core network node, and the core network node determines which satellite currently provides service in the relevant area according to the positioning information of the terminal reported by the base station and the movement track of the satellite, and taking the base station which currently provides service for the position where the terminal is connected last time as the base station which is configured for currently paging the terminal this time; in this way, when the core network node fails to successfully page the terminal, all the base stations in the satellite Internet communication system are determined as the base stations for currently paging the terminal, and the paging of the terminal is performed again.

For example, when the terminal releases from the connected state back to the idle state (e.g.: registration state or service end state), the base station sends the positioning information of the terminal obtained in the connection state to the core network; and when the core network pages the terminal, which satellite currently provides service in the relevant area according to the stored positioning information of the terminal and the moving track of the satellite are judged, and then the terminal only at the base station on the satellite where the terminal is located in the connection state last time is paged. If it fails, the paging range is further extended to all base stations of the entire TA.

Optionally, when the terminal needed to be paged does not have positioning capability, a third implementation means of the step 22 is:

acquiring the information of a serving base station, a serving cell and a time stamp when the terminal releases the connection;

determining the position of the terminal according to the information of the serving base station, the serving cell and the time stamp; and determining the base station for currently paging the terminal according to the position of the terminal.

It should be noted that in this implementation, when the terminal releases the connection, since the terminal does not have positioning capability, the base station connected before the terminal releases the connection will send the information of the serving base station which serves the terminal, the serving cell, and the time stamp to the core network node when the terminal releases the connection, and the core network node pages the terminal according to the relevant information reported by the base station, the position of the terminal to be paged is determined, and the base station serving the area containing the position is determined as the base station for currently paging the terminal; in this way, when the core network node fails to successfully page the terminal, all the base stations in the satellite Internet communication system are determined as the base stations for currently paging the terminal, and the paging of the terminal is performed again.

For example, when the terminal releases from the connected state back to the idle state (e.g.: registration state or service ending state), relevant information such as the current serving base station, the serving cell, the time stamp and the like of the terminal are sent to a core network through signaling. When paging the terminal, the core network judges which satellite currently provides service in the relevant area according to the stored historical information (the serving base station, the serving cell, the time stamp and the like) of the terminal and the moving track of the satellite, and then the terminal is paged only at the base station on the satellite where the terminal is located when entering the idle state. If it fails, the paging range is further extended to all base stations of the entire TA.

Secondly, the setting mode is setting at least two fixed TAs.

It should be noted that for transparent-transmission satellites (that is to say, the satellites only retransmit the signal of the ground base stations in radio frequency forwarding means, and the base station is located on the ground), the satellites actually has no relationship with the TA, and the TA to which the satellite cell belongs is completely determined by the ground serving base station.

It should be noted for the case of the base station carried by the satellite, one of the fixed TAs includes at least one ground cell when the ground cell corresponding to the beam of the base station belonging to the fast-moving medium or low orbit satellite is the fixed cell.

In the case that the ground cell is the fixed cell, the satellite is in a certain orbit, the ground cell is unchanged, a plurality of cells (hundreds or even thousands of cells) are statically divided in the whole satellite orbit, and the same satellite needs to generate different cells at different positions. Therefore, the ground TAs can also be allocated according to the statically divided cells, and several cells are divided into one TA. Therefore, the satellite cells are reconfigured at intervals during satellite movement.

For example, 500 satellite cells (assuming 1-500) are deployed during the satellite moves a circle around the earth, the cells are fixed, similar to the cells in the conventional communication networks. A satellite (e.g. satellite A) makes the cell it projects on the ground fixed by adjusting the antenna angle and some parameters over a period of time, e.g. the satellite A always projects cell 1 over a period of time. When satellite A is away from the location of the cell and cannot continue to serve it, it is taken over by the next satellite (e.g. satellite B), and the satellite A continues to serve the ground cell (e.g. cell 2) in front of the cell 1.

In the above cases, since the ground cell is fixed as in the conventional mobile communication network, therefore, allocation of the TA may be identical to that in the conventional mobile communication network, and a static ground area may cover a plurality of cells. In this case, the terminal can be paged by reusing the existing terminal location-based paging method in 4G, 5G.

When the ground cell corresponding to the beam of the base station belonging to the fast-moving medium or low orbit satellites is the mobile cell, an updating manner of the fixed TAs is: according to the position of the statically allocated fixed TA, the position and the beam coverage condition of the base station, when it is determined that the cell managed by the base station moves to the area of the next fixed TA, the base station reconfigures the fixed TA, and the reconfigured TA information is broadcasted through the system information updating.

In the case that the ground cell is the mobile cell, one satellite fixedly supports one or several cells. During the movement of the satellite, the beam rapidly sweeps across the ground and the ground cell also moves rapidly. In such a case, whether a certain cell under the controlled moves to the area of the next TA or not needs to be judged according to the statically allocated TA position combined with the position and the beam coverage of the satellite, the base station on the satellite performs corresponding reconfiguration, and new TA information is broadcasted through system information updating.

Furthermore, in the case that the ground cell is the mobile cell, a first implementation of the step 22 is:

acquiring the first TA update information sent by the first base station where the TA update occurs;

determining the latest TA information of the current satellite Internet communication system according to the first TA update information; and determining the base station for currently paging the terminal according to the latest TA information and the TA registered by the terminal when the terminal needs to be paged.

It should be noted that the above-mentioned first base station refers to a base station where the TA update occurs, and the base station may be one or more. That is, when the TA served by a certain base station changes, the configuration update procedure can be notified to the core network node through an NG interface (i.e. the interface between the base station and the core network node);

for example, when the interface is initially established, the base station only reports to the core network node one or more TAs where the cell currently under the control is located, that is a list of the TAs for which the base station actually serves, e.g. the five cells of the satellite A are initially in the area of the TA1, the cell 1 enters TA2 as the satellite cell moves on the ground, and the cells 2-5 are still in the TA1, the base station then needs to update the supported TA to the core network node as TA1+TA2; and after a while, all the 5 cells moved to the TA2, at this time, the base station needs to update the supported TA again to the CN.

The core network node accurately grasps the TA condition supported by each base station at each moment accordingly. According to the TA or the TA list registered by the terminal, a corresponding base station is accurately found for paging during paging. It should be noted that in this way, all the base stations on the satellites update the TA constantly, which is disadvantageous for signaling overhead and power saving.

Furthermore, in the case that the ground cell is the mobile cell, the second implementation of the step 22 is:

acquiring the second TA update information sent by the second base station, wherein TA update occurs in the second base station within the preset time;

determining the TA updating rule of the base station according to the second TA update information; and determining the base station for currently paging the terminal according to the TA updating rule and the TA registered by the terminal when the terminal needs to be paged.

It should be noted that the second base station refers to a base station in which the TA update occurs within a preset time, and the base station may be one or more. In this case, the base station where the TA update occurs does not report the TA update information at all times, and just updates the supported TA to the core network node for a period of time.

For example, when the interface is initially established, the base station only reports to the core network node one or more TAs where the cell currently under the control is located, that is a list of the TAs for which the base station actually serves; the base station reports changes to the core network node when the supported TA changes within a period of time (e.g. within a few days) when the base station starts to operate, e.g. five cells of the satellite A are initially within the area of the TA1, in two days, the five cells move on the ground as the satellite moves, on the first day, the cell 1 enters the TA2, and the cells 2-5 are still in the TA1, at this time the base station needs to update the supported TA to the core network node as TA1+TA2; on the second day, all the five cells move to the TA2, at this time, the base station needs to update the supported TA to the core network node again; and on the third day, when the TA supported by the base station is changed, the supported TA cannot be updated to the core network node again.

The core network records the TA updating rule of the base stations on each satellite so as to infer that a certain TA is served by the base stations on which satellite or satellites at a certain moment, and when the terminal needs to be paged in the TA, only the paging message needs to be sent to the base stations on the relevant satellites.

Furthermore, in the case that the ground cell is the mobile cell, the third implementation of the step 22 is:

acquiring the TA information supported on the whole satellite orbit; and determining the base station for currently paging the terminal according to the TA information and the pre-configured ephemeris when the terminal needs to be paged.

It should be noted that in this way, the base station does not update the supported TA to the core network, and at the time of the initial NG interface establishment, the base station can tell the core network node all the TA on the whole orbit as a list of supported TA. From the pre-configured ephemeris, the core network node can clearly know the trajectory of each satellite, the exact coverage of each satellite at each point in time, and the exact range of each TA. When the core network node needs to page the terminal, only the base stations on which satellites serve the TA where the terminal is located are judged, and the paging message is accurately sent to the base stations on the corresponding satellites.

Thirdly, the setting mode is that at least two non-fixed TAs are set.

It should be noted that a non-fixed TA refers that the division of the TA is non-fixed with respect to the ground, i.e. the TA is bound to the base station on the satellite, and the TA moves with the movement of the base station on the satellite. In this way, the specific implementation of the step 22 is: determining the base station corresponding to the TA to which the terminal belongs as the base station for currently paging the terminal.

For example, the satellite A supports the cells 1-5, corresponding to the TA1, which are supported regardless of the location to which the satellite moves. In this way, the base station on the satellite does not need to adjust the antennas and the parameters, does not need to reconfigure the cell, and pages the terminal based on the TA where the terminal is located. However, with the movement of the satellite and the change of TA, the stationary terminal still needs to update TA frequently, which increases the signaling load of the system to some extent.

It should be noted that, in the embodiments of the present disclosure, the base station for paging the terminal when the terminal needs to be paged is determined according to the setting mode of the TA in the satellite Internet communication system, so that the paging process in the satellite Internet communication system is improved, and the communication reliability of the satellite Internet communication system can be ensured.

As shown in FIG. 3, the embodiment of the present disclosure also provides a paging method applied to the base station in the satellite Internet communication system, including:

step 31, receiving the paging message sent by the core network node according to the setting mode of the tracking area TA;

wherein the setting mode includes one of the following modes:

dividing the satellite Internet communication system into one TA;

setting at least two fixed TAs;

and setting at least two non-fixed TAs.

Optionally, the setting mode includes: when at least two fixed TAs are set, the paging method further includes the steps:

if the TA information is updated, sending the first TA update information to the core network node.

Optionally, the setting mode includes: when at least two fixed TAs are set, the paging method further includes the steps:

in the preset time, if the TA information is updated, sending the second TA update information to the core network node.

Optionally, the setting mode includes: when at least two fixed TAs are set, the paging method further includes the steps:

according to the position of the statically allocated fixed TA, the position and the beam coverage condition of the base station, when it is determined that the cell managed by the base station moves to the area of the next fixed TA, the base station reconfigures the fixed TA, and the reconfigured TA information is broadcasted in a broadcast through system information updating; and wherein, the base station is a base station belonging to a fast-moving medium or low orbit satellite.

Wherein in the above-mentioned embodiments, all the description about the base station is applicable to the embodiment of the paging method applied to the base station, and the same technical effect can be achieved.

As shown in the FIG. 4, the embodiment of the present disclosure also provides a positioning information sending method applied to the base station in the satellite Internet communication system, including:

step 41, when the setting mode of the tracking area TA in the satellite Internet communication system is dividing the satellite Internet communication system into one TA and the terminal has positioning capability, when the terminal releases the connection, the positioning information of the terminal is sent to the core network node; or when the setting mode of the TA in the satellite Internet communication system is dividing the satellite Internet communication system into one TA and the terminal does not have positioning capability, when the terminal releases the connection, the serving base station, the serving cell and the time stamp information of the terminal are sent to the core network node.

Wherein, in the above-mentioned embodiments, all the description about the base station is applicable to the embodiment of the positioning information sending method applied to the base station, and the same technical effects can be achieved.

As shown in FIG. 5, the embodiment of the present disclosure provides a core network node 50 in the satellite Internet communication system, including:

an acquisition module 51, which is used for acquiring the setting mode of the tracking area TA in the satellite Internet communication system;

a determination module 52, which is configured for determining the base station for paging the terminal according to the setting mode; and a first sending module 53. which is configured for sending the paging messages to the base station;

wherein the setting mode includes one of the following modes:

dividing the satellite Internet communication system into one TA;

setting at least two fixed TAs; and setting at least two non-fixed TAs.

Optionally, when the setting mode is dividing the satellite Internet communication system into one TA, the determination module 52 is configured to:

determine all base stations in the satellite Internet communication system as the base stations for currently paging the terminal.

Optionally, when the setting mode is dividing the satellite Internet communication system into one TA, and the terminal has positioning capability, the determination module 52 includes:

a first acquisition unit, which is used for acquiring the positioning information and the moving track of the satellite when the terminal releases the connection; and a first determination unit, which is configured for determining the base station for currently paging the terminal according to the positioning information and the moving track of the satellite.

Optionally, when the setting mode is dividing the satellite Internet communication system into one TA and the terminal does not have positioning capability, the determination module 52 includes:

a second acquisition unit, which is used for acquiring the serving base station, the serving cell and the time stamp information when the terminal releases the connection;

a second determination unit, which is configured for determining the position of the terminal according to the serving base station, the serving cell and the time stamp information; and a third determination unit, which is configured for determining the base station for currently paging the terminal according to the position of the terminal.

Optionally, when the setting mode is setting at least two fixed TAs, one of the fixed TAs includes at least one ground cell when the ground cell corresponding to the beam of the base station belonging to the fast-moving medium or low orbit satellite is the fixed cell.

Optionally, when the setting mode is setting at least two fixed TAs and when the ground cell corresponding to the beam of the base station belonging to the fast-moving medium or low orbit satellites is the mobile cell, an updating manner of the fixed TAs is: according to the position of the statically allocated fixed TA, the position and the beam coverage condition of the base station, when it is determined that the cell managed by the base station moves to the area of the next fixed TA, the base station reconfigures the fixed TA, and the reconfigured TA information is broadcasted through the system information updating.

Furthermore, the determination module 52 includes:

a third acquisition unit, which is used for acquiring the first TA update information sent by the first base station where the TA update occurs;

a fourth determination unit, which is configured for determining the latest TA information of the current satellite Internet communication system according to the first TA update information; and a fifth determining unit, which is configured for determining the base station for currently paging the terminal according to the latest TA information and the TA registered by the terminal when the terminal needs to be paged.

Furthermore, the determination module 52 includes:

a fourth acquisition unit, which is used for acquiring the second TA update information sent by the second base station, wherein TA update occurs in the second base station within the preset time;

a sixth determining unit, which is configured for determining the TA updating rule of the base station according to the second TA update information; and a seventh determining unit, which is configured for determining the base station for currently paging the terminal according to the TA updating rule and the TA registered by the terminal when the terminal needs to be paged.

Furthermore, the determination module 52 includes:

a fifth acquisition unit, which is used for acquiring the TA information supported on the whole satellite orbit; and an eighth determination unit, which is configured for determining the base station for currently paging the terminal according to the TA information and the pre-configured ephemeris when the terminal needs to be paged.

Optionally, when the setting mode is that at least two non-fixed TAs are set, the determination module 52 is configured to:

determine the base station corresponding to the TA to which the terminal belongs as the base station for currently paging the terminal.

It should be noted that the embodiments of the core network node are core network nodes correspond to the above-mentioned embodiments of the method on a one-to-one basis, and all the implementation means in the above-mentioned embodiments of the method are suitable for the embodiments of the core network node and can achieve the same technical effect.

As shown in FIG. 6, the embodiment of the present disclosure also provides a core network node 60 including a processor 61, a transceiver 62, a memory 63 and a computer program stored on the memory 63 and executable by the processor 61; wherein, the transceiver 62 is connected with the processor 61 and the memory 63 via a bus interface, wherein the processor 61 is configured for reading the program in the memory to perform the following processes:

acquiring the setting mode of the tracking area TA in the satellite Internet communication system; determining the base station for paging the terminal according to the setting mode; and sending the paging message to the base station via the transceiver 62; and wherein the setting mode includes one of the following modes:

dividing the satellite Internet communication system into one TA;

setting at least two fixed TAs; and setting at least two non-fixed TAs.

It should be noted that in FIG. 6, the bus architecture may include any number of interconnected buses and bridges, particularly one or more processors represented by the processor 61 and various circuits of memory represented by the memory 63 linked together. The bus architecture may also link various other circuits, such as peripheral devices, voltage regulators, power management circuits and the like, which is well known in the art, therefore, it will not be described further herein. The bus interface provides an interface. The transceiver 62 may be a number of elements, including a transmitter and a transceiver, and providing a unit for communicating with various other devices on a transmission medium. Aiming at different terminals, the processor 61 is responsible for managing the bus architecture and the usual processing, and the memory 63 can store data used by the processor 61 which performs operations.

Optionally, when the setting mode is dividing the satellite Internet communication system into one TA, when executing the computer program, the processor performs the following step:

determining all base stations in the satellite Internet communication system as the base stations for currently paging the terminal.

Optionally, when the setting mode is dividing the satellite Internet communication system into one TA, the terminal has positioning capability, and when executing the computer program, the processor performs the following steps:

acquiring the positioning information and the moving track of the satellite when the terminal releases the connection; and determining the base station for currently paging the terminal according to the positioning information and the moving track of the satellite.

Optionally, when the setting mode is dividing the satellite Internet communication system into one TA and the terminal does not have positioning capability, when executing the computer program, the processor performs the following steps:

acquiring the serving base station, the serving cell and the time stamp information when the terminal releases the connection;

determining the position of the terminal according to the serving base station, the serving cell and the time stamp information; and determining the base station for currently paging the terminal according to the position of the terminal.

Optionally, when the setting mode is setting at least two fixed TAs, one of the fixed TAs includes at least one ground cell when the ground cell corresponding to the beam of the base station belonging to the fast-moving medium or low orbit satellite is the fixed cell.

Optionally, when the setting mode is setting at least two fixed TAs and when the ground cell corresponding to the beam of the base station belonging to the fast-moving medium or low orbit satellites is the mobile cell, an updating manner of the fixed TAs is: according to the position of the statically allocated fixed TA, the position and the beam coverage condition of the base station, when it is determined that the cell managed by the base station moves to the area of the next fixed TA, the base station reconfigures the fixed TA, and the reconfigured TA information is broadcasted through the system information updating.

Furthermore, when executing the computer program, the processor performs the following steps:

acquiring the first TA update information sent by the first base station where the TA update occurs;

determining the latest TA information of the current satellite Internet communication system according to the first TA update information; and determining the base station for currently paging the terminal according to the latest TA information and the TA registered by the terminal when the terminal needs to be paged.

Furthermore, when executing the computer program, the processor performs the following steps:

acquiring the second TA update information sent by the second base station, wherein TA update occurs in the second base station within the preset time;

determining the TA updating rule of the base station according to the second TA update information; and determining the base station for currently paging the terminal according to the TA updating rule and the TA registered by the terminal when the terminal needs to be paged.

Furthermore, when executing the computer program, the processor performs the following steps:

acquiring the TA information supported on the whole satellite orbit; and determining the base station for paging the terminal according to the TA information and the pre-configured ephemeris when the terminal needs to be paged.

Optionally, when the setting mode is that at least two non-fixed TAs are set, the processor performs the following step when executing the computer program:

determining the base station corresponding to the TA to which the terminal belongs as the base station for currently paging the terminal.

The embodiment of the present disclosure also provides a computer readable storage medium which stores the computer program, wherein, the computer program, when executed by a processor, implements the steps of the paging method applied to the core network node.

As shown in FIG. 7, the embodiment of the present disclosure provides a base station 70 in the satellite Internet communication system, including:

a receiving module 71, which is configured for receiving the paging message sent by the core network node according to the setting mode of the tracking area TA; and wherein the setting mode includes one of the following modes:

dividing the satellite Internet communication system into one TA;

setting at least two fixed TAs; and setting at least two non-fixed TAs.

Optionally, the setting mode includes: when at least two fixed TAs are set, the base station 70 also includes:

a first update information sending module, which is configured for sending the first TA update information to the core network node if the TA information is updated.

Optionally, the setting mode includes: when at least two fixed TAs are set, the base station 70 also includes:

a second update information sending module, which is configured for sending the second TA update information to the core network node if the TA information is updated within a preset time.

Optionally, the setting mode includes: when at least two fixed TAs are set, the base station 70 also includes:

a reconfiguration module, which is configured for performing reconfiguration of the fixed TA when determining that the cell managed by the base station moves to the area of the next fixed TA according to the position of the statically allocated fixed TA, the position and the beam coverage condition of the base station, and broadcasting the reconfigured TA information through system information updating;

wherein, the base station is a base station belonging to a fast-moving medium or low orbit satellite.

It should be noted that the base station embodiment is a base station corresponding one-to-one to the above-mentioned method embodiment, and all the implementation means in the above-mentioned paging method embodiment are applicable to the base station embodiment, and the same technical effect can be achieved.

Figure 8:
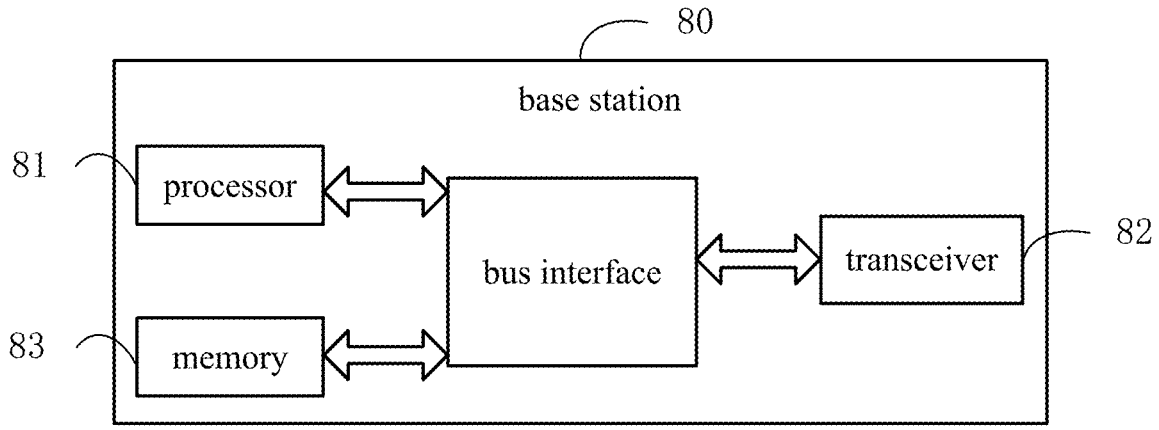
FIG. 8 is a first structure diagram of a base station according to an embodiment of the present disclosure.

As shown in FIG. 8, the embodiment of the present disclosure also provides a base station 80 including a processor 81, a transceiver 82, a memory 83, and a computer program stored on the memory 83 and executable by the processor 81; wherein the transceiver 82 is connected with the processor 81 and the memory 83 via a bus interface, wherein the processor 81 is configured for reading the programs in the memory and performing the following processes:

receiving the paging message sent by the core network node according to the setting mode of the tracking area TA via the transceiver 82; and wherein, the setting mode includes one of the following modes:

dividing the satellite Internet communication system into one TA;

setting at least two fixed TAs; and setting at least two non-fixed TAs.

It should be noted that in the FIG. 8, the bus architecture can include any number of interconnected buses and bridges, particularly one or more processors represented by the processor 81 and various circuits of memory represented by the memory 83 linked together. The bus architecture may also link various other circuits, such as peripheral devices, voltage regulators, power management circuits and the like, which is well known in the art, therefore, it will not be described further herein. The bus interface provides the interface. The transceiver 82 can be a number of elements, including the transmitter and the transceiver, providing the unit for communicating with various other devices over the transmission medium. Aiming at different terminals, the processor 81 is responsible for managing the bus architecture and general processing, and the memory 83 can store the data used by the processor 81 which performs operations.

Optionally, the setting mode includes: when at least two fixed TAs are set, when executing the computer program the processor implements the following step:

if the TA information is updated, sending the first TA update information to the core network node.

Optionally, the setting mode includes: when at least two fixed TAs are set, the processor, when executing the computer program, implements the following step:

sending the second TA update information to the core network node if the TA information is updated within a preset time.

Optionally, the setting mode includes: when at least two fixed TAs are set, the processor, when executing the computer program, implements the following step:

performing reconfiguration of the fixed TA when determining that the cell managed by the base station moves to the area of the next fixed TA according to the position of the statically allocated fixed TA, the position and the beam coverage condition of the base station, and broadcasting the reconfigured TA information through system information updating; and wherein, the base station is a base station belonging to a fast-moving medium or low orbit satellite.

The embodiment of the present disclosure also provide a computer-readable storage medium which stores the computer program, wherein the computer program when executed by the processor implements the steps of the paging method applied to the base station.

Figure 9:
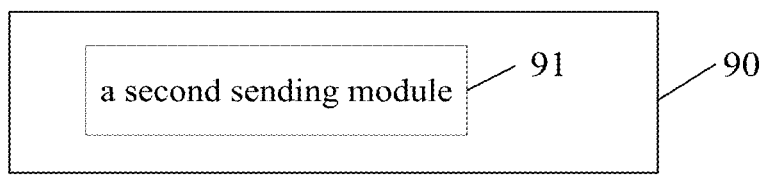
FIG. 9 is a second module schematic diagram of a base station according to an embodiment of the present disclosure.

As shown in FIG. 9, the embodiment of the present disclosure provides a base station 90 in the satellite Internet communication system, including:

a second sending module 91, which is configured for sending the positioning information of the terminal to the core network node when the terminal releases the connection when the setting mode of the tracking area TA in the satellite Internet communication system is dividing the satellite Internet communication system into one TA and the terminal has positioning capability; or the second sending module 91 is configured for sending the serving base station, the serving cell and the time stamp information of the terminal to the core network node when the terminal releases the connection, and when the TA in the satellite Internet communication system is set in such a way dividing the satellite Internet communication system into one TA and the terminal does not have positioning capability.

It is to be noted that the base station embodiment is a base station corresponding one-to-one to the above-mentioned method embodiment, and all the implementation means in the above-mentioned positioning information sending method embodiment are applicable to the base station embodiment, and the same technical effects can be achieved.

Figure 10:
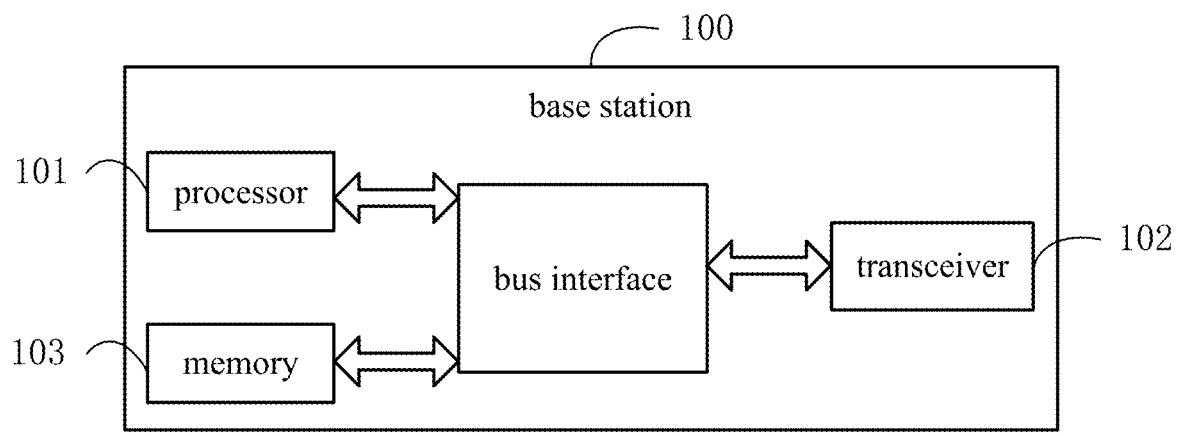
FIG. 10 is a second structure diagram of a base station according to an embodiment of the present disclosure.

As shown in FIG. 10, the embodiment of the present disclosure also provides a base station 100 including a processor 101; a transceiver 102; a memory 103; and a computer program stored on the memory 103 and executable by the processor 101; wherein the transceiver 102 is connected with the processor 101 and the memory 103 through a bus interface, wherein the processor 101 is configured for reading the program in the memory to execute the following processes:

sending the positioning information of the terminal to the core network node when the terminal releases the connection when the setting mode of the tracking area TA in the satellite Internet communication system is dividing the satellite Internet communication system into one TA and the terminal has positioning capability; or when the setting mode of the TA in the satellite Internet communication system is dividing the satellite Internet communication system into one TA and the terminal does not have positioning capability, when the terminal releases the connection, the serving base station, the serving cell and the time stamp information of the terminal are transmitted to the core network node through the transceiver 102.

It should be noted that in FIG. 10, the bus architecture can include any number of interconnected buses and bridges, particularly one or more processors represented by the processor 101 and various circuits of memory represented by the memory 103 linked together. The bus architecture may also link various other circuits, such as peripheral devices, voltage regulators, power management circuits and the like, which is well known in the art, therefore, it will not be described further herein. The bus interface provides the interface. The transceiver 102 can be a number of elements, including the transmitter and the transceiver, providing the unit for communicating with various other devices over the transmission medium. Aiming at different terminals, the processor 101 is responsible for managing the bus architecture and the general processing, and the memory 103 can store the data used by the processor 101 in performing operations.

The embodiment of the present disclosure also provide a computer-readable storage medium where stores the computer program, wherein when the computer program is executed by a processor, the steps of the positioning information transmission method applied to a base station are implemented.

Wherein, the base station mentioned in the embodiment of the present disclosure can be the global system of mobile communication (GSM), the base transceiver station (BTS) in the code division multiple access (CDMA), the base station (Node B, NB) in the wideband code division multiple access (WCDMA), and can also be evolutional Node B (eNB or eNodeB) in the long term evolution (LTE), a relay station, an access point, or a base station in a future 5G network, it is not limited here, wherein the base station can be a base station deployed on the ground or a base station located on the satellite (can also be referred to as the satellite base station).

While there have been described what are considered to be alternative embodiments of the disclosure, it will be understood by those skilled in the art that various changes and modifications may be made without departing from the spirit and scope of the disclosure.

What is claimed is:

1. A paging method, applied to a core network node in a satellite Internet communication system, comprising:
    acquiring a setting mode of a tracking area TA in the satellite Internet communication system;
    determining, according to the setting mode, one or more base stations for paging a terminal; and
    sending a paging message to the one or more base stations;
    wherein the setting mode comprises one of the following modes:
    dividing the satellite Internet communication system into one TA;
    setting at least two fixed TAs; or
    setting at least two non-fixed TAs,
    wherein when the setting mode is dividing the satellite Internet communication system into one TA, and the terminal has positioning capability, the determining the one or more base stations for paging the terminal comprises:
    acquiring positioning information and a moving track of a satellite when the terminal releases connection; and
    determining the base station for currently paging the terminal according to the positioning information and the moving track of the satellite;
    or,
    when the setting mode is dividing the satellite Internet communication system into one TA and the terminal does not have positioning capability, the determining the one or more base stations for paging the terminal comprises:
    acquiring a serving base station, a serving cell and time stamp information when the terminal releases connection;
    determining a position of the terminal according to the serving base station, the serving cell and the time stamp information; and
    determining the base station for currently paging the terminal according to the position of the terminal;
    or,
    when the setting mode is setting at least two fixed TAs, one fixed TAs comprises at least one ground cell when a ground cell corresponding to the beam of the base station belonging to a fast-moving medium or low orbit satellite is a fixed cell;
    or,
    when the setting mode is setting at least two fixed TAs and when a ground cell corresponding to a beam of the base station belonging to a fast-moving medium or low orbit satellites is a mobile cell, an updating manner of the fixed TAs is that: according to a position of a statically allocated fixed TA, a position and a beam coverage condition of the base station, when it is determined that a cell managed by the base station moves to an area of a next fixed TA, the base station reconfigures the fixed TA, and information of the reconfigured TA is broadcasted through system information updating.

2. The paging method according to claim 1, wherein, when the setting mode is dividing the satellite Internet communication system into one TA, the determining the one or more base stations for paging the terminal comprises:
    determining all base stations in the satellite Internet communication system as the base stations for currently paging the terminal.

3. The paging method according to claim 1, wherein when the setting mode is setting at least two fixed TAs and when the ground cell corresponding to the beam of the base station belonging to the fast-moving medium or low orbit satellites is a mobile cell, the determining the base station for paging the terminal comprises:
    acquiring first TA update information sent by a first base station where TA update occurs;
    determining the latest TA information of a current satellite Internet communication system according to the first TA update information; and
    determining the base station for currently paging the terminal according to the latest TA information and a TA registered by the terminal when the terminal needs to be paged.

4. The paging method according to claim 1, wherein when the setting mode is setting at least two fixed TAs and when the ground cell corresponding to the beam of the base station belonging to the fast-moving medium or low orbit satellites is a mobile cell, the determining the base station for paging the terminal comprises:
    acquiring second TA update information sent by a second base station, wherein TA update occurs in the second base station within a preset time;
    determining a TA updating rule of the base station according to the second TA update information; and
    determining the base station for currently paging the terminal according to the TA updating rule and the TA registered by the terminal when the terminal needs to be paged.

5. The paging method according to claim 1, wherein when the setting mode is setting at least two fixed TAs and when the ground cell corresponding to the beam of the base station belonging to the fast-moving medium or low orbit satellites is a mobile cell, the determining the base station for paging the terminal comprises:
    acquiring TA information supported on a whole satellite orbit; and
    determining the base station for currently paging the terminal according to the TA information and a pre-configured ephemeris when the terminal needs to be paged.

6. A paging method applied to a base station in a satellite Internet communication system, comprising:
    receiving a paging message sent by a core network node according to a setting mode of a tracking area TA, the paging message is to be sent to a terminal;
    wherein the setting mode comprises one of the following modes:
    dividing the satellite Internet communication system into one TA;
    setting at least two fixed TAs; and
    setting at least two non-fixed TAs,
    wherein when the setting mode is dividing the satellite Internet communication system into one TA, and the terminal has positioning capability, the base station is used for currently paging the terminal and is determined by the core network node through following steps:

acquiring positioning information and a moving track of a satellite when the terminal releases connection; and determining the base station for currently paging the terminal according to the positioning information and the moving track of the satellite;

or, when the setting mode is dividing the satellite Internet communication system into one TA and the terminal does not have positioning capability, the base station is used for currently paging the terminal and is determined by the core network node through following steps:

acquiring a serving base station, a serving cell and time stamp information when the terminal releases connection;

determining a position of the terminal according to the serving base station, the serving cell and the time stamp information; and determining the base station for currently paging the terminal according to the position of the terminal;

or, when the setting mode is setting at least two fixed TAs, one fixed TAs comprises at least one ground cell when a ground cell corresponding to the beam of the base station belonging to a fast-moving medium or low orbit satellite is a fixed cell;

or, when the setting mode is setting at least two fixed TAs and when a ground cell corresponding to a beam of the base station belonging to a fast-moving medium or low orbit satellites is a mobile cell, an updating manner of the fixed TAs is that: according to a position of a statically allocated fixed TA, a position and a beam coverage condition of the base station, when it is determined that a cell managed by the base station moves to an area of a next fixed TA, the base station reconfigures the fixed TA, and information of the reconfigured TA is broadcasted through system information updating.

7. The paging method according to claim 6, wherein the setting mode is setting at least two fixed TAs, the paging method further comprises:

if TA information is updated, sending first TA update information to the core network node.

8. The paging method according to claim 6, wherein the setting mode is setting at least two fixed TAs, the paging method further comprises:

sending second TA update information to the core network node if TA information is updated within a preset time.

9. The paging method according to claim 6, wherein the setting mode is setting at least two fixed TAs, the paging method further comprises:

performing reconfiguration of the fixed TA when determining that a cell managed by the base station moves to an area of the next fixed TA according to a position of the statically allocated fixed TA, the position and a beam coverage condition of the base station, and broadcasting the information of the reconfigured TA through system information updating;

wherein, the base station is a base station belonging to a fast-moving medium or low orbit satellite.

10. A core network node in a satellite Internet communication system, comprising a memory, a processor and a computer program stored on the memory and executable by the processor; wherein the processor implements the following steps when executing the computer program:

acquiring setting mode of a tracking area TA in the satellite Internet communication system;

determining one or more base station for paging a terminal according to the setting mode; and sending a paging message to the one or more base stations;

wherein the setting mode comprises one of the following modes:

dividing the satellite Internet communication system into one TA;

setting at least two fixed TAs; and setting at least two non-fixed TAs, wherein when the setting mode is dividing the satellite Internet communication system into one TA, and the terminal has positioning capability, the determining the one or more base stations for paging the terminal comprises:

acquiring positioning information and a moving track of a satellite when the terminal releases connection; and determining the base station for currently paging the terminal according to the positioning information and the moving track of the satellite;

or, when the setting mode is dividing the satellite Internet communication system into one TA and the terminal does not have positioning capability, the determining the one or more base stations for paging the terminal comprises:

acquiring a serving base station, a serving cell and time stamp information when the terminal releases connection;

determining a position of the terminal according to the serving base station, the serving cell and the time stamp information; and determining the base station for currently paging the terminal according to the position of the terminal;

or, when the setting mode is setting at least two fixed TAs, one fixed TAs comprises at least one ground cell when a ground cell corresponding to the beam of the base station belonging to a fast-moving medium or low orbit satellite is a fixed cell;

or, when the setting mode is setting at least two fixed TAs and when a ground cell corresponding to a beam of the base station belonging to a fast-moving medium or low orbit satellites is a mobile cell, an updating manner of the fixed TAs is that: according to a position of a statically allocated fixed TA, a position and a beam coverage condition of the base station, when it is determined that a cell managed by the base station moves to an area of a next fixed TA, the base station reconfigures the fixed TA, and information of the reconfigured TA is broadcasted through system information updating.

11. The core network node according to claim 10, wherein when the setting mode is dividing the satellite Internet communication system into one TA, and when executing the computer program, the processor performs the following step:

determining all base stations in the satellite Internet communication system as the base stations for currently paging the terminal.

12. The core network node according to claim 10, wherein when the setting mode is setting at least two fixed TAs and when the ground cell corresponding to the beam of the base station belonging to the fast-moving medium or low orbit satellites is a mobile cell, the processor, when executing the computer program, performs the following steps:

acquiring first TA update information sent by the first base station where TA update occurs;

determining the latest TA information of a current satellite Internet communication system according to the first TA update information; and determining the base station for currently paging the terminal according to the latest TA information and the TA registered by the terminal when the terminal needs to be paged.

13. The core network node according to claim 10, wherein when the setting mode is setting at least two fixed TAs and when the ground cell corresponding to the beam of the base station belonging to the fast-moving medium or low orbit satellites is a mobile cell, the processor, when executing the computer program, performs the following steps:

acquiring second TA update information sent by a second base station, wherein TA update occurs in the second base station within a preset time;

determining a TA updating rule of the base station according to the second TA update information; and determining the base station for currently paging the terminal according to the TA updating rule and the TA registered by the terminal when the terminal needs to be paged.

14. The core network node according to claim 10, wherein when the setting mode is setting at least two fixed TAs and when the ground cell corresponding to the beam of the base station belonging to the fast-moving medium or low orbit satellites is a mobile cell, the processor, when executing the computer program, performs the following steps:

acquiring TA information supported on a whole satellite orbit; and determining the base station for currently paging the terminal according to the TA information and a pre-configured ephemeris when the terminal needs to be paged.

\* \* \* \* \*